United States Patent [19]

Zimmer et al.

[11] 4,358,476

[45] Nov. 9, 1982

[54] RADIATION-CURABLE COMPOSITIONS CONTAINING WATER

[75] Inventors: David J. Zimmer; Frederick H. Sexsmith, both of Erie; Dennis D. Howard, Girard, all of Pa.

[73] Assignee: Lord Corporation, Erie, Pa.

[21] Appl. No.: 278,299

[22] Filed: Jun. 24, 1981

[51] Int. Cl.$^3$ .............................................. B05D 3/06
[52] U.S. Cl. .................................... 427/44; 427/53.1; 427/54.1
[58] Field of Search ....................... 427/54.1, 53.1, 44

[56] References Cited

U.S. PATENT DOCUMENTS 3,669,728  6/1972  Seiner .
3,823,027  7/1974  Wismer et al. ................. 204/159.16
4,075,366  2/1978  Packer et al. ..................... 427/54.1

OTHER PUBLICATIONS

Hislop et al., "Journ. of Coatings Technology", V50, #642, 7-1978, pp. 69-77.
"Finishing Industries", Apr. 1977, p. 36.

Primary Examiner—John H. Newsome
Attorney, Agent, or Firm—John A. Gazewood

[57] ABSTRACT

Radiation-curable compositions are described comprising at least one olefinically unsaturated polymeric material, at least one unsaturated diluent monomer which is copolymerizable with the polymeric material and water. The compositions are readily cured in oxygen-containing and inert environments upon exposure to actinic or ionizing irradiation to a finish having a desired light-scattering effect.

5 Claims, No Drawings

RADIATION-CURABLE COMPOSITIONS CONTAINING WATER

This invention relates to radiation-curable compositions. More particularly, the invention relates to radiation-curable coating and ink compositions which can be cured to a finish having desired light-scattering characteristics.

The need to reduce solvent emissions and to conserve energy in chemical processes, such as in the paint, coating and ink industries, has resulted in an acceleration of the development of 100 percent reactive systems, that is, substantially all of the components, excluding non-reactive materials such as fillers and pigments, react during curing to become an integral part of the cured film or coating. Such systems generally produce significantly less organic emissions and cure with less energy consumption as compared to coating and ink lacquers which contain significant amounts of volatile inert organic solvents.

Typically, radiation-curable compositions are composed of various reactive components which cure by polymerization through free radical or ionic mechanisms. Each component is designed to perform a specific function in both the uncured composition and the cured film. The components include, (1), a reactive low-to-medium weight polymer, generally referred to as an oligomer, which imparts primary performance characteristics to the cured film; (2), monofunctional and polyfunctional reactive monomers which can contribute to the degree of crosslinking required in the cured film and otherwise function as reactive diluent to adjust the viscosity of the formulation to a level suitable for application; and, (3), various non-reactive, specialty components such as filler, colorants, slip agents and release agents, which are added for various end-use properties.

When properly formulated, the radiation-curable formulations are readily curable by exposure to actinic radiation or ionizing radiation in either inert or oxygen-containing atmospheres. Generally, the curing of these 100 percent reactive organic compositions results in clear films having a glossy finish. However, in many applications, clarity and high gloss may not be desirable. Uniform hiding of the substrate is very often required of the coating, and may be achieved by pigmentation. In the case of coatings to be cured by actinic irradiation, for example, ultraviolet light, addition of pigments generally adversely affects the cure process. This is due to scattering of the actinic rays before they can thoroughly penetrate and effect polymerization through the depth of the applied coating. Heavily pigmented coatings are worse in this regard than formulations having relatively low pigment volume concentrations. White pigments such as titanium dioxide are particularly inhibitive of light-induced polymerization. The standard inorganic and organic pigments can also have adverse effects on the chemical and/or colloidal storage stability of radiation-curable coatings, and on their application and handling characteristics. Even where hiding is not required, such as the case of varnishes for the furniture industry, gloss level may be important. Lower gloss levels are often wanted. With conventional inert solvent-based lacquer compositions, gloss reduction can be obtained by adding a flatting agent such as silica to the coating or ink composition. Flatting, that is, gloss reduction, is effected with such conventional lacquers by evaporation of the inert solvent and shrinkage of the film during the curing cycle, which results in exposure of the flatting agent above the surface of the cured film. Because radiation-curable formulations contain little, if any, volatile organic solvents, the conventional method of gloss reduction is less effective in achieving desired levels of gloss reduction. For example, while the gloss of radiation-curable films can be reduced by adding flatting agents such as silica, an equal amount of the flatting agent based on resin solids is not as effective for reducing gloss of the energy-cured film as the same amount in a 50% solids lacquer. Further, the addition of flatting agents increases the viscosity of the formulations to such an extent that proper application viscosity cannot be maintained. The resulting undesirably high viscosities cannot be adjusted simply by increasing the volume of reactive diluent because an imbalance in the reactive oligomer-reactive diluent ratio may result in separation of the formulations into distinct resin and diluent phases and can adversely affect ultimate film properties. In addition, many flatting pigments, such as calcium stearate, zinc stearate, aluminum rosinate, talc and clay, not only increase viscosities to undesirably high levels but also exhibit a blocking effect on actinic irradiation. This phenomenon not only adversely affects ultimate film properties but also extends cure times and, in many instances, regardless of the length of exposure to actinic radiation, will not provide a satisfactory degree of cure.

Among the proposed solutions to the problem of reducing the gloss of radiation-curable compositions is the use of a,a,a-trichlorotoluene as a photoinitiator. According to the patentees, Shahidi et al, U.S. Pat. No. 3,992,275, the use of this compound provides finishes which, when cured by ultraviolet radiation, are low in gloss and cure at essentially the same rate as nonmodified ultraviolet curable systems. The solution proposed by Carder, U.S. Pat. No. 3,966,572, involves the use of acrylic acid and silica to produce lower gloss films. According to the patentee, the acrylic acid permits the use of silica as a flatting agent without appreciable increases in viscosity and thixotropy. Hahn, U.S. Pat. No. 3,918,393, disclose a two-step method of producing flat or non-glossy films comprising subjecting a substantially solventless, radiation-sensitive material to ionizing irradiation or actinic light in an atmosphere containing at least 5000 parts per million of oxygen and subsequently subjecting the material to ionizing irradiation or actinic light in an inert gas such as nitrogen or an atmosphere containing less than 1000 parts per million of oxygen. McDowell, U.S. Pat. No. 4,169,167, discloses a two-step method of producing such flat or non-glossy films comprising exposing a radiation-curable composition to actinic radiation in an oxygen-rich atmosphere at differential intensity levels. Transparent films are provided by these methods. Packer et al, U.S. Pat. No. 4,075,366, disclose transparent, low gloss films which are obtained by exposing an oil-in-water emulsion of a relatively viscous radiation-curable resin to actinic radiation and effecting cure of the composition before the emulsion breaks. Wismer et al, U.S. Pat. No. 3,803,027, disclose the preparation of cured opaque films by exposing a composition comprising at least one radiation-sensitive material and an organic solvent having a specified solubility with the material and which is present in an amount in the range of 10 to 70 percent by weight of the total composition and which also has a boiling point of at least 46° C. and a flash point of at least 10° C. to actinic light. Wismer et al U.S. Pat. No. 4,005,244 disclose a method of reducing surface gloss which comprises subjecting a composition comprising an ultraviolet light-curable component, a component which is not significantly ultraviolet light-curable and a photoinitiator to actinic radiation. During the cure, the curable component and the non-curable component phase separate and dendritic microfractures appear at phase boundaries to provide opacity to the cured coatings. Wismer et al U.S. Pat. No. 4,020,193 disclose a method of reducing surface gloss which comprises subjecting a composition comprising unsaturated polyester, an ethylenically unsaturated monomer and an organic peroxide to actinic light. The compositions can optionally contain peroxide accelerators, such as tertiary aromatic amines, and photopolymerization catalysts, such as benzoin and benzoin methyl ether. Other methods of effecting gloss reduction have been by surface roughness through pigment or wax flotation, embossing and texturizing with a cover sheet.

In accordance with the present invention, it has now been discovered that certain compositions comprising radiation-sensitive polymeric materials and water, wherein the water is uniformly dispersed throughout a continuous organic phase containing no inert volatile organic solvent, are readily cured in oxygen-containing or inert atmospheres upon exposure to actinic or ionizing radiation to provide strong films with desirable light-scattering characteristics. These characteristics may range broadly from translucency to opaqueness, or from a matted, flat-type of finish to one with considerable hiding power. It has also been discovered that the light-scattering effect provided in accordance with the invention can be further enhanced by incorporating pigments, dyes, fluorescent materials and optical brighteners into either or both the water phase and the organic phase.

The compositions of the present invention can be broadly described as substantially homogeneous dispersions of water in discrete droplets as a discontinuous phase in the organic component as a continuous phase. The water is typically present in amounts in the range from 0.1 to 50, preferably 0.5 to 35, percent by weight, based on total weight of the composition, to provide uncured formulations which appear optically as water-in-oil emulsions. The amount of water which can be dispersed into the organic phase is dependent upon the organic chemical structure of the radiation sensitive polymeric material, with such polymeric materials having non-ionogenic hydrophilic structural features, such as the ethylene oxide recurring unit $(CH_2CH_2O)n$, wherein n is at least 2, being able to tolerate the greatest amounts of water. It should be noted that substantially all of the polymeric materials which can be employed in the invention are able to assimilate varying amounts of water and remain clear or transparent. Curing such transparent water-containing compositions typically provides transparent, high gloss films. Such compositions are not within the scope of the invention. The continued addition of water to such transparent water-containing compositions, sometimes in miniscule amounts, will result in the development of the translucent to opaque turbidity generally associated with water-in-oil emulsions. Thus, notwithstanding the stated limits, the lower limit of water can be quantitatively defined as the minimum amount of water necessary to form a visible water-in-oil emulsion. The upper limit of water is determined by the emulsifying capacity of the system which can enable as much as 60 percent by weight of water to be dispersed in the form of a stable water-in-oil emulsion. Quantitatively, the maximum amount of water which can be incorporated into any system is the level at which the water-in-oil emulsion inverts to an oil-in-water emulsion, at which point the systems will not be colloidally stable and will be outside the scope of the invention.

With respect to the radiation-sensitive polymeric material, there can be employed in the practice of the invention substantially any polymeric material which is substantially water-insoluble; has at least one, preferably at least two, terminal, internal or side-chain olefinically unsaturated unit(s) per molecule; is not water-reactive; and is curable by exposure to an appropriate irradiation source through a free radical or cationic polymerization mechanism. Such radiation-sensitive polymeric materials will have a molecular weight of at least 300, preferably in the range from 600 to 6000, and preferably will have from 0.5 to 3 units of $\alpha,\beta$-olefinic unsaturation per 1000 units of molecular weight. Representative unsaturated materials are vinyl, acrylic and substituted acrylic, allylic, fumaric, maleic, dienic and the like compounds having at least one unit of olefinic unsaturation per molecule, which unsaturation can be present as an internal, terminal or side chain unsaturated group, including combinations of such groups, with terminal unsaturation being currently preferred. Such unsaturated polymeric materials include, without limitation, olefinically-unsaturated polyethers, polyesters, polyetheresters, polyacrylates and substituted polyacrylates, polyepoxides, polyurethanes, silicones polyamides, polyamines and the like. A preferred group of such olefinically unsaturated polymeric materials includes the acrylated resins, such as acrylated silicone oils, acrylated soybean oil, acrylic and substituted acrylic resins, acrylated epoxides and acrylated nitrogen-containing resins. Especially preferred olefinically unsaturated materials include acrylated polyesters, acrylated polyetheresters, acrylated polyethers, and acrylated polycaprolactones and acrylated polyurethane resins, with acrylated resins based at least in part on at least one poly(alkylene oxide) polyol being particularly preferred. Such olefinically unsaturated materials, including their manufacture, are well known, see Burlant et al U.S. Pat. No. 3,509,234; Smith et al U.S. Pat. No. 3,700,643; Boranian et al U.S. Pat. No. 3,924,023 and Howard U.S. Pat. No. 4,133,723.

One such preferred group of polymeric materials comprise unsaturated urethane and analogous-to-urethane resins which are characterized by the presence of at least one ethylenically unsaturated unit having the structure $>C=C<$, aid unsaturated resins comprising the reaction product of:

(I) at least one organic isocyanate compound characterized by the presence of at least two reactive isocyanate groups;

(II) from about 30 to 100 mol percent of at least one polymeric material characterized by the presence of at least two isocyanate-reactive active hydrogen groups;

(III) from about 70 to 0 mol percent of at least one monomeric chain-extending compound characterized by the presence of at least two isocyanate-reactive active hydrogen groups; and (IV) at least one addition-polymerizable unsaturated monomeric compound having a single isocyanate-reactive active hydrogen;

the mol percents of (II) and (III) being based on total mols of (II) and (III);

said isocyanate compounds (I) being present in an amount sufficient to provide an NCO:active hydrogen ratio greater than 1:1, preferably at least 1.05:1, and more preferably in the range 2.3–5:1 with respect to the active hydrogen groups; and said addition-polymerizable unsaturated monomeric compound (IV) being present in an amount sufficient to provide at least one mol or equivalent of active hydrogen group per mol of available isocyanate moiety. Such preferred unsaturated resins will have a residual reactive isocyanate moiety, based on total weight of the resin, of not more than one, preferably not more than 0.1, percent by weight. The ethylenically unsaturated unit is preferably a terminal group having the structure $CH_2=C<$. Such resins have the further characteristic features (a) The polymerizable ethylenically unsaturated group is separated from the main or backbone carbon-carbon chain by at least one, preferably at least two, urethane or analogous group(s) or combination of such groups;

(b) a molecular weight of at least 300, preferably 600 to 6000; and (c) the presence of 0.5 to 3 ethylenically unsaturated units per 1000 units of molecular weight.

An especially preferred group of unsaturated urethane resins comprises the reaction product of:

(I) at least one organic isocyanate compound having at least 2 isocyanate groups:

(II) at least one poly(alkylene oxide) polyol; and (III) at least one unsaturated addition-polymerizable monomeric compound having a single isocyanate-reactive active hydrogen group;

there being present an excess of isocyanate compound with respect to the hydroxyl groups of said poly(alkylene oxide) polyol;

said unsaturated addition-polymerizable monomeric compound having a single isocyanate-reactive hydrogen group being present in an amount sufficient to provide at least one mol equivalent of active hydrogen group with respect to isocyanate reactivity.

A second especially preferred group of unsaturated urethane resins comprises the reaction product of:

(i) at least one organic isocyanate compound having at least two isocyanate groups;

(ii) at least one polyetherester polyol having at least two hydroxyl groups, said polyetherester polyol comprising the reaction product of:

(a) from 3 to 100, preferably 40 to 100, mol percent of at least one poly(alkylene oxide)polyol having at least two hydroxyl groups;

(b) from 97 to zero mol percent of at least one polymeric non-poly(alkylene oxide)polyol having at least two hydroxyl groups;

(c) from 97 to zero mol percent of at least one monomeric polyol having at least two hydroxyl groups; and (d) from 97 to zero mol percent of at least one polyester which does not contain poly(alkylene oxide)polyol residues in its backbone;

said mol percents being based on total mols of precursor materials (ii)(a)–(ii)(d); and (e) at least one organic polycarboxylic acid characterized by the presence of at least two carboxyl groups; and (iii) at least one unsaturated addition-polymerizable monomeric compound having a single isocyanate-reactive active hydrogen group;

there being present an excess of isocyanate compound with respect to the hydroxyl groups of said polyetherester polyol;

said unsaturated addition-polymerizable monomeric compound having a single isocyanate-reactive active hydrogen group being present in an amount sufficient to provide at least one molar equivalent of active hydrogen group with respect to isocyanate reactivity.

Another preferred group of polymeric materials comprise unsaturated oligomers having a main chain or backbone containing the residue of at least one poly(alkylene oxide)polyol. Such unsaturated oligomers comprise the reaction product of:

(I) at least one olefinically unsaturated compound having a single reactive moiety selected from the group consisting of carboxyl and hydroxyl; and (II) at least one organic compound having in its main chain a unit having the structure $(YO)_n$; wherein Y is a hydrocarbon chain having at least one carbon atom and which can be interrupted by one or more ether oxygen atoms; n is at least 2; said organic compound having at least two hydroxyl groups or two carboxyl groups; said organic compound being selected from the group consisting of (A) poly(alkylene oxide) polyhydroxy compounds;

(B) polyetherester polyhydroxy compounds; and (C) carboxyl-functional polyetherester compounds; said compounds (B) and (C) comprising the reaction product of (i) from 3 to 100, preferably 50 to 100 mol percent of at least one poly(alkylene oxide) polyol having at least two hydroxyl groups;

(ii) from 97 to zero, preferably 60 to zero, mol percent of at least one polymeric non-poly(alkylene oxide) polyol, said polymeric polyol having at least two hydroxyl groups;

(iii) from 97 to zero, preferably 60 to zero, mol percent of at least one monomeric polyol having at least two hydroxyl groups; and (iv) from 97 to zero, preferably 60 to zero, mol percent of at least one polyester which does not contaim poly(alkylene oxide) polyol residues in its backbone;

said mol percents being based on total mols of precursor materials (i)–(iv); and (v) at least one organic polycarboxylic acid characterized by the presence of at least two carboxyl groups, including anhydrides of such acids. Such oligomers have as characteristic features at least one ethylenically unsaturated group having the structure $>C=C<$, preferably $CH_2=C<$, said group preferably being terminally located; and having a main chain or backbone containing the residue of at least one poly(alkylene oxide) polyol, said main chain being separated from said ethylenically unsaturated group by at least one ester group. Preferably, all hydroxy or carboxyl moieties will be capped with an olefinically unsaturated compound having a single hydroxyl- or carboxyl-reactive moiety, which moiety depends upon the use of polyhydroxy poly(alkylene oxide), polyhydroxy polyetherester or polycarboxy polyetherester as a starting material. Like the unsaturated urethane resins, the unsaturated oligomers will preferably have molecular weights of at least 300, and especially in the range of 600 to 6000 and from 0.5 to 3 ethylenically unsaturated units per 1000 units of molecular weight.

The isocyanate compounds which are employed in forming unsaturated urethane polymers and oligomers which can be utilized in the energy curable compositions of the present invention can be any organic isocyanate compound having at least two free isocyanate groups. Included within the purview of suitable polyisocyanates are aliphatic, cycloaliphatic and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates and combinations such as alkylene cycloalkylene and alkylene arylene polyisocyanates, can be employed in the practice of the invention, including mixtures of such polyisocyanates.

Suitable polyisocyanates include, without limitation, tolyene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4'4''-triisocyanate, polymethylene poly(phenylisocyanate), m-phenylene diisocyanate, p-phenylene diisocyanate, 2,6-tolylene diisocyanate, 1,5-naphthalene diisocyanate, napthalene-1,4-diisocyanate, diphenylene-4,4'-diisocyanate, 3,3'-bi-tolylene-4,4'-diisocyanate, 1,4-cyclohexylene dimethylene diisocyanate, 1,6-cyclohexylene dimethylene diisocyanate, xylylene-1,4-diisocyanate, xylylene-1,3-diisocyanate, cyclohexyl-1,4-diisocyanate, 4,4'-methylene-bis-(cyclohexyl isocyanate) 3,3'-dimethyl-diphenylmethane-4,4'-diisocyanate, isophorone diisocyanate, the product obtained by reacting trimethylol propane and 2,4-tolylene diisocyanate in a ratio of 1:3, and the like. The aliphatic diisocyanate compounds are preferred, with 4,4'-methylene-bis(cyclohexyl isocyanate) being especially preferred.

Active hydrogen-containing polymeric precursor materials which can be employed in forming reactive unsaturated urethane polymers and oligomers which are suitable for use in the radiation-curable compositions of this invention can be linear or branched and include any polymeric material having at least two isocyanate-reactive active hydrogen groups per molecule as determined by the Zerewitinoff method. Such polymeric materials are well-known and need not be discussed herein in any detail. Suitable active hydrogen-containing compounds include, without limitation, polyethers and polythioethers such as polyethylene glycol, polypropylene glycol, polytetramethylene glycol and the corresponding thiol analogues, hydroxy-terminated polyalkylene esters of aliphatic, cycloaliphatic and aromatic acids having at least two carboxyl groups, and including anhydrides of such acids; esters of polyhydric alcohols and hydroxy fatty acids; alkyd resins containing hydroxyl end groups; hydroxyl-terminated polybutadiene resins; hydroxylated acrylic and substituted acrylic resins; hydroxyl-terminated vinyl resins; polycaprolactones; polythiols; polyamine and polyamide resins and the like. Currently, hydroxyl-containing materials are preferred.

Especially preferred as active hydrogen-containing precursors for forming the especially preferred reactive unsaturated resins, including reactive unsaturated urethane resins, are poly(alkylene oxide) polyols and polyetherester polyols which have as an integral part of the backbone or main polymer chain the residue of at least one poly(alkylene oxide) polyol. The polyetherester polyol can be derived entirely from poly(alkylene oxide) polyols or can contain up to 97 mol percent, based on total hydroxyl content, of at least one non-poly(alkylene oxide) polyol monomeric or polymeric material having at least two hydroxy groups.

The poly(alkylene oxide) polyols having at least two hydroxyl groups which are employed in the practice of the invention are normally obtained from the polymerization, including block copolymerization, of cyclic ethers such as alkylene oxides, dioxolane and tetrahydrofuran, the condensation of glycols, or the condensation of cyclic ethers with glycols. They are well-known articles of commerce, and are also called polyalkylene ether glycols, polyalkylene glycols, polyalkylene oxide glycols, polyglycols and polyoxyalkylene glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 106 to 4000, preferably about 106 to about 2500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols derived from cyclic ethers such as dioxolane, which affords a polyol having the formula $HO(CH_2—OCH_2CH_2O)_n$, where n is greater than 1. The alkylene segment can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. Representative poly(alkylene oxide) polyols include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus the poly(alkylene oxide) polyols will generally have from 2 to 6 hydroxyl groups, with such polyols having 2 hydroxyl groups being currently preferred. Preferred poly(alkylene oxide) polyols are poly(tetramethylene oxide) polyols, poly(propylene oxide) polyols, poly(ethylene oxide-propylene oxide) and poly(ethylene oxide) polyols, with the latter being especially preferred.

Another useful group of poly(alkylene oxide) polyols which can be employed in the practice of the invention are poly(alkylene etherthioether) compounds, which compounds have the identical formula as the poly(alkylene oxide) polyols except that some of the ether oxygens have been replaced with sulfur atoms. Such polyols are conveniently prepared by the reaction of a compound such as thiodiglycol with ethylene glycol in the presence of a catalytic amount of p-toluene sulfonic acid. Other polyethers, such as poly(alkylene oxide-arylene ether) polyols may be used.

Substantially any of the known monomeric alcohols having at least two hydroxyl groups, and polymeric non-poly(alkylene oxide) polyols having at least two hydroxyl and polyesters which do not contain poly(alkylene oxide) polyol residues in the backbone or main chain can be employed in combination with poly(alkylene oxide) polyols to form polyetherester polyols which serve as precursor materials for unsaturated urethane oligomers of the invention. Representative monomeric and polymeric polyols and polyesters which can optionally provide up to about 97 mol percent of hydroxyl functionality include 1,4 butanediol; 1,3-butylene glycol; 1,6-hexane diol; cyclohexane diol; 4,4'-methylene-bis-(cyclohexanol); glycerol; trimethylolpropane; 1,2,6-hexanetriol; erythritol; pentaerythritol; neopentyl glycol; polycaprolactone diols and triols, poly(butadene) diols; hydroxylated poly(butadiene) dienes; poly(tetramethylene adipate) diol; poly(ethylene succinate) diol; poly(1,3-butylene sebacate) diol; and (1,3-butylene glycol/glycerine/adipic acid/isophthalic acid) diols and triols. Mixtures of such monomeric and polymeric compounds can be employed.

Polycarboxylic acids which may be employed in forming the polyetherester polyols which are suitable for use in the present invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimellitic acid, tricarballylic acid, and other known polycarboxylic acids of varying types. It is currently preferred that the polyetherester include an aliphatic dicarboxylic acid as at least part of the acid component.

Essentially any monomeric compound having at least two isocyanate-reactive active hydrogen groups which is known to or can be expected to function as a chain-extender to increase molecular weight, introduce chain-branching, affect flexibility and the like in reactions between isocyanate compounds and compounds containing active hydrogen groups can be employed in forming the preferred unsaturated resins of the invention. Such chain-extending compounds are well-known in the art and require no detailed elaboration. Preferrably, the active hydrogen groups of such chain-extending compounds will be selected from among hydroxyl, thiol, primary amine and secondary amine, including mixtures of such groups, with hydroxyl and primary amine being currently preferred. The chain-extending compounds will generally have molecular weights of at least 25, and preferably between 62 and 225. Especially preferred chain-extending compounds include aliphatic diols free of alkyl substitution and aliphatic triols having from 2 to 14 carbon atoms. Representative chain-extending compounds include water, ethylene glycol, 1,3-propane diol, 1,4-butane diol, 1,6-hexane diol, trimethylol propane, triethylene glycol, glycerol, 1,2-propane-bis(4-cyclohexyl amine), methane-bis(4-cyclohexyl amine), N,N'-dimethyl o-phenylene diamine, 1,3-propane dithiol, monoethanolamine, and amino ethyl mercaptan.

Substantially any of the known monomeric alcohols having at least two hydroxyl groups, polymeric non-poly(alkylene oxide) polyol materials having at least two hydroxyl or carboxyl groups, and polyesters having at least two hydroxyl or carboxyl groups but which do not contain poly(alkylene oxide) polyol residues in the backbone or main chain can be employed in combination with poly(alkylene oxide) polyols to form the polyhydroxyl and polycarboxy polyetherester compounds which serve as precursor materials for the unsaturated oligomers of this invention. Representative monomeric and polymeric polyhydroxy and polymeric polycarboxy compounds which can optionally provide up to about 97 mol percent with respect to the composition of the polyetherester starting materials include 1,4-butane diol; 1,3-butylene glycol; 1,6-hexane diol; 1,4-cyclohexane diol; 4,4'-methylene-bis(cyclohexynol); glycerol; tri-methylolpropane; 1,2,6-hexanetriol; erythritol; pentaerythritol; neopentyl glycol; propcaprolactone diols and triols; poly(butadene) diols and dicarboxylic acids; hydroxylated poly(butadene) diols and diacids; poly(1,3-butylene sebacate) diols and diacids; and (1,3-butylene glycol/glycerine/adipic acid/isophthalic acid) poly-hydroxy materials and the corresponding polycarboxy materials. Mixtures of such monomeric and polymeric compounds can be employed.

Polycarboxylic acids which may be employed in forming the polyhydroxy and polycarboxy polyetherester materials which serve as precursor materials for the unsaturated oligomers of this invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimelitic acid, tricarballylic acid, and other known polycarboxylic acids of varying types. It is currently preferred that the polyetherester includes an aliphatic dicarboxylic acid as at least part of the acid component.

Suitable addition-polymerizable monomeric compounds having a single ethylenically unsaturated unit and a single isocyanate-reactive hydroxyl active hydrogen group which can be used in the preferred compositions of this invention include 2-hydroxyethyl acrylate, 3-hydroxy-propyl acrylate, 4-hydroxybutyl acrylate, 8-hydroxyoctyl acrylate, 12-hydroxydodecanyl acrylate, 6-hydroxyhexyl oleate, hydroxy neopentyl acrylate, hydroxyethyl vinyl ether, and the corresponding methacrylates, and allyl alcohol.

The polyetherester precursor materials for the unsaturated oligomers of the invention are prepared by conventional esterification techniques employing conventional apparatus. Esterification is generally effected in the presence of an inert atmosphere such as nitrogen. The poly(alkylene oxide) polyol and non(polyalkylene oxide) polyol monomeric and polymeric materials are mixed in a suitable reactor and heated with agitation to from 60° C. to 100° C. or higher. The acid components are then added and heating with agitation continued at a temperature and rate such that the water of esterification can be rapidly removed, generally by distillation. When producing hydroxy-functional polyetherester materials, the esterification reaction is continued until the acid number is 10 or less and substantially all of the water of esterification and low-boiling impurities are removed. In the case of carboxy-functional polyetherester materials, the esterification reaction is terminated when there is reached an acid number corresponding to the desired equivalent weight of the resulting carboxyfunctional polyether ester.

Ethylenically unsaturated carboxylic acids which are reacted with the above-described polyhydroxy poly(alkylene oxide) and polyhydroxy-polyetherester compounds include acrylic acid, methacrylic acid, crotonic acid, α-phenylacrylic acid, cyanoacrylic acid, methoxy acrylic acid, α-cyclohexylacrylic acid, and the like. There can also be used the unsaturated partial esters of unsaturated and saturated aliphatic, cycloaliphatic and aromatic polycarboxylic acids which are monobasic in nature, that is, the polycarboxylic partial ester has only one free reactive carboxyl group, which group is available for reaction with the hydroxyl groups of the poly-(alkylene oxide) polyol and the polyhydroxy polyether ester. Such partial esters are readily formed by reacting polycarboxylic acids, such as succinic, acid, terephthalic acid, tetrahydroterephthalic acid and the like with an unsaturated monofunctional compound such as 2-hydroxyethyl acrylate, 2-hydroxyethyl methacrylate, the corresponding thiols and allyl alcohol and the like under conditions such that all carboxyl groups but one are esterified. Currently, the unsaturated aliphatic monocarboxylic acids having from 3 to 10 carbon atoms are preferred, particularly acrylic and methacrylic acids. It is understood that mixtures of carboxylic acids can be employed.

Substantially any known compound which has at least one polymerizable ethylenically unsaturated linkage or moiety and a single reactive hydroxyl group can be employed as a reactant with the herein-described carboxyl-terminated polyetheresters to form unsaturated oligomers suitable for use in the present invention. A particularly preferred class of such compounds are the hydroxyalkyl esters of acrylic and methacrylic acids, representative of which are 2-hydroxyethyl acrylate, 2-hydroxyethyl methacrylate, 2-hydroxypropyl acrylate, 2-hydroxypropyl methacrylate, diethylene glycol acrylate, diethylene glycol methacrylate, 4-hydroxbutyl acrylate, 4-hydroxybutyl methacrylate, 3-chloro-2-hydroxypropylacrylate, 3-chloro-2-hydroxypropyl methacrylate, trimethylolpropane acrylate, trimethylopropane dimethacrylate, pentaerythritol triacrylate and pentaerthyritol trimethacrylate. Also useful are the diol esters of other unsaturated acids, particularly α,β-olefinically unsaturated acids, including crotonic acid, tiglic acid, and undecylenic acid. The hydroxy-functional partial esters of diols and half-esters of dicarboxylic acids are also useful. Representative of these partial esters are 2-hydroxypropyl ethyl fumarate, 2-hydroxypropyl methyl itaconate, 2-hydroxyethyl fumarate, and diethylene glycol ethyl maleate. Other unsaturated dicarboxylic acids whose half esters can be employed include, without limitation thereto, angelic acid, cinnamic acid, aconitric acid, citraconic acid, mesaconic and glutaconic acid. Another useful class of such ethylenically unsaturated compounds are unsaturated alcohols such as allyl alcohol, methallyl alcohol, methyl vinyl carbinol, beta-allyloxyethanol, para-allylbenzyl alcohol, crotyl alcohol, and unsaturated phenols such as ortho-, meta-, or para-hydroxystyrene and ortho- or para-allyl phenol. Other useful ethylenically unsaturated monohydroxy compounds which are equivalent to those herein recited will be readily apparent to the person of ordinary skill in the art.

The preferred unsaturated resins of the invention can be prepared by any of several reaction routes. For example, the isocyanate compound, the polymeric material having at least two active hydrogen groups, the addition-polymerizable monomeric compound having a single ethylenically unsaturated group and a single isocyanate-reactive active hydrogen group and, when used, the chain-extending compound can be simultaneously reacted together. Currently, it is preferred to form the unsaturated resins in two or more steps comprising, (1), reacting the isocyanate compound, the polymeric material, and, if used, the chain-extending compound to provide an isocyanate-functional prepolymer and, (2), reacting the prepolymer with the addition-polymerizable unsaturated monomeric compound having a single isocyanate-reactive active hydrogen group. The reaction is terminated at the desired state of viscosity, which will generally correspond to a molecular weight of at least 600, preferably 900 to 6000, which is usually a function of an end-use requirement. Any excess isocyanate moieties can be capped if desired or necessary by the addition of monofunctional chain-terminating agents, such as monoalcohols and monoamines, preferably having from one to 4 carbon atoms, and morpholine. Regardless of the process employed, it is preferred to conduct the reaction in its entirety in the presence of a diluent phase which is copolymerizable with the unsaturated resin product but is inert with respect to the manufacture of the resin.

Unsaturated resins suitable for use in the radiation-curable composition of the invention can also be obtained by reacting, (1), at least one poly(alkylene oxide) polyol or polyhydroxyl polyetherester, including mixtures thereof, and at least one compound containing at least one polymerizable ethylenically unsaturated moiety and a single reactive carboxyl group; and (2), at least one polycarboxy polyetherester and at least one compound containing at least one polymerizable ethylenically unsaturated moiety and a single reactive hydroxyl group; under well-known esterifying conditions, for example, at a temperature in the range from 70°-250° C. for 3 to 20 hours, in the presence or absence of an esterification catalyst, such as sulfuric acid, para-toluene sulfonic acid and methane sulfonic acid, to result in esterification of the hydroxy groups with carboxyl groups. Preferably, the hydroxy- and carboxy-containing materials will be used in amounts sufficient to obtain a completely esterified unsaturated oligomer.

The compositions optionally, but preferably, can contain up to 80, preferably 15 to 50, percent by weight, based on total weight of composition, of at least one reactive diluent monomer. Broadly, such reactive monomers comprise at least one radiation-sensitive unsaturated monomeric compound which is polymerizable alone or copolymerizable with other radiation-sensitive unsaturated monomers and/or unsaturated polymers upon exposure to an appropriate energy source, such as actinic radiation. The reactive monomer can be monofunctional or polyfunctional, with respect to polymerizable moieties. A single monofunctional reactive monomer can be used, as can mixtures thereof; or a single polyfunctional reactive monomer can be used, as can mixtures thereof. Currently, it is preferred to use mixtures of one or more monofunctional reactive monomers and one or more polyfunctional reactive monomers. When employed as a reactive diluent system, the reactive monomers will typically comprise from 10 to 80, preferably 10 to 40, percent by weight, based on total weight of the compositions. Representative reactive diluent monomers include, with limitation, hexyl acrylate, cyclohexyl acrylate, 2-ethylhexyl acrylate, octyl acrylate, nonyl acrylate, stearyl acrylate and the corresponding methacrylates; 2-hydroxyethhy acrylate and methacrylate; diallyl adipate and maleate; styrene; methyl acrylate, butyl acrylate, isobutyl acrylate, 2-phenoxy acrylate, 2-methoxyethyl acrylate, 2-(N,N-diethylamino)-ethyl acrylate and the corresponding methacrylates; acrylonitrile; methyl acrylonitrile; methacrylamide; neopentyl glycol diacrylate, ethylene glycol diacrylate, hexylene glycol diacrylate, diethylene glycol diacrylate, trimethylolpropane triacrylate, pentaerythritol di-, tri-, and tetra-acrylate, and the corresponding methacrylates; N-vinyl pyrollidone, and the like. Currently, it is preferred that at least 50 percent by weight of reactive diluent system comprise at least one acrylic or methacrylic ester or diester having at least 6 carbon atoms in the non-acid moiety, with acrylic acid derivatives being especially preferred. Reactive diluent systems are well known in the field of radiation curing and the selection of an appropriate diluent system in any given instance is sufficiently encompassed by such knowledge that further elaboration is unnecessary.

The compositions of the invention can also contain up to 20, preferably 0.5 to 12, percent by weight of total composition of at least one polythiol having at least two —SH groups per molecule. Operable polythiols usually have molecular weights in the range from 94 to 20,000, preferably from 100 to 10,000. The polythiols are exemplified by the general formula $R^1$—$(SH)_n$, wherein n is at least 2 and $R^1$ is a polyvalent organic radical free of reactive carbon-carbon unsaturation. $R^1$ may contain cyclic groups, as well as hetero atoms such as N, S, P, or O, but primarily contains carbon-hydrogen-, carbon-oxygen-, or silicone-oxygen containing chain linkages essentially free of reactive carbon-carbon unsaturation. Representative polythiols include, without limitation, ethane dithiol, decamethylene dithiol, tolylene-2,4-dithiol, and esters of thioglycolic acid, α-mercaptopropionic acid and β-mercaptopropionic acid such as ethylene glycol bis-(thioglycolate), ethylene glycol bis-(β-mercaptopropionate), trimethylolpropane tris-(thioglycolate), trimethylolpropane tris-(β-mercaptopropionate), pentaerythritol tetrakis-(thioglycolate), pentaerythritol tetrakis-(β-mercaptopropionate) and polypropylene ether glycol bis-(β-mercaptopropionate.

The compositions of the invention can also contain from 0.1 to 10 percent by weight of total composition of acrylic acid as well as pigments, fillers, flattening agents, flow control agents and other additives typically present in coating compositions. Such additive materials are well known as are the concentrations at which they are used and require no further elaboration.

The compositions of the invention are readily cured by exposure to actinic or ionizing irradiation in oxygen-containing and inert atmospheres through either or both free radical and cationic polymerizations. Both free radical and cationic polymerization mechanisms are sufficiently well known, as are the methods by which they are effected, that a detailed discussion is not necessary. When cure is effected by exposure to actinic irradiation through either or both free radical or cationic polymerization mechanisms, one or more photopolymerization catalysts are included in the formulation, at a concentration in the range from 0.1 to 15, preferably 0.5 to 10 percent by weight of polymerizable materials. Representative photopolymerization catalysts which are typically employed for free radical polymerization of the water-containing formulations of this invention include, without limitation, benzophenone, p-methoxybenzophenone, acetophenone, m-chloroacetophenone, propiophenone, xanthion, benzaldehyde, naphthoouinone, anthraquinone, di-t-butylperoxide, dicumyl peroxide, t-butyl peroxide, t-butyl peracetate, peracetic acid, perbenzoic acid, benzoyl peroxide, dichlorobenzoyl peroxide, azo-(isobutyronitrile), dimethyl azo bis-(isobutyrate), morpholine, diethylamine, piperidine, pyrrolidine, benzoin, benzil, ethyl benzoin ether, isopropyl benzoin ether, butyl benzoin ether, isobutyl benzoin ether, α,α-diethoryacetophenone, α,α-diethoxy-α-phenylacetophenone, dimethoxy- -phenylacetophenone, 4,4′-dicarboethoxybenzoin ethyl ether, benzoin phenyl ether, α-methylolbenzoin methyl ether and α,α,α-trichloroacetophenone. Representative cationic photopolymerization catalysts include, without limitation, triphenylsulfonium hexafluorophosphate, triphenylsulfonium tetraborate, dimethydphenylsulfonium hexafluorophosphate, diphenyliodinium hexafluorophosphate, 2,4,6-triphenylthiopyrylium hexafluorophosphate, 2,6-diphenyl-4-p-methoxyphenylthiopyrylium tetrafluoroburate, 2,6-di-p-tolyl-4-phenylthiopyrylium tetrafluoroborate, 2,4,6-tri-p-methoxyphenylthiopyrylium tetrafluoroborate and 2-methyl-4,6-diphenylthiopyrylium tetrafluoroborate. Preferably, the cationic photopolymerization catalysts will be employed in combination with at least one free radical photopolymerization catalyst. When cure is effected by exposure to ionizing irradiation, photopolymerization catalysts are not strictly required, but may be used, if desired. Particularly effective photocatalysts systems for use with actinic irradiation are the systems disclosed in Gruber U.S. Pat. No. 4,017,652; Howard U.S. Pat. No. 4,133,723; and McDowell et al U.S. Pat. No. 4,224,454.

The gloss control compositions of the invention are readily prepared by mixing the components to be used by conventional mixing or blending procedures customarily utilized in the art for preparing emulsions. Such procedures are well known and require no elaboration herein since there is nothing critical in following the procedures. It should be noted that certain of the compositions, particularly those comprising oligomers prepared in whole or part from ethylene oxide or its oxyethylated derivatives, while substantially water-insoluble, are sufficiently self-emulsifiable that they can be admixed with water to from homogeneous systems without the need for external emulsifiers. In other cases, the use of external emulsifiers, especially of the nonionic type, is typically necessary, especially when it is desired to obtain a greater reduction in gloss, which is effected at higher water levels.

At room temperature, the uncured compositions have an optical appearance ranging from clear (transparent) to opaque. It is this physical appearance of the uncured compositions which is indicative of the optical characteristics of the cured product. Typically, uncured compositions which are clear at room temperature will provide cured products which are clear with a higher gloss, that is, the gloss will not be reduced or only slightly reduced. Translucent compositions generally provide cured products having a translucent appearance and medium gloss values. That is, there will be a significant gloss reduction and, often, some increase in hiding power as well. The greatest light-scattering is provided by the opaque compositions, which are opaque after cure but soon transpire the retained water to provide a translucent finish. It should be noted that in all cases, the water, which must be present in the compositions at the time of cure, is initially retained in the cured products. This water transpires from the film quite rapidly following the cure, typically in less than 24 hours, including those compositions having the highest water levels.

The role of water, in providing light-scattering effects in the cured film, is complemented by including opacifying pigments or flatting agents in the radiation-curable compositions. In these cases, the inorganic particles work in concert with the microvoids which are left when the water diffuses from the cured film to provide the appropriate light-scattering centers. The overall effect can be tailored by formulation to be one of hiding (pigmentation) or primarily gloss reduction (flatting). Typically, opacifying pigments and flatting agents, when used, will be employed in a weight ratio of inorganic particle to radiation-sensitive polymeric material from 0.1:1 to 5:1, preferably 0.5:1 to 3:1. The inorganic particles can be incorporated into either or both the organic phase or the water phase. The degree of hiding is enhanced by incorporating the pigment into the water phase, as by slurrying the pigment in water and blending the slurry into the organic phase, in comparison to merely blending the pigment into the organic phase. Conversely, flatting is enhanced by blending the pigment directly into the organic phase as compared to incorporating the pigment into the water phase.

The radiation-curable compositions of the invention are typically used to form cured adherent coatings on substrates such as metals, wood and plastic. The substrate is coated with the compositions of the invention using substantially any known technique, including spraying, curtain coating, dipping, roller application, printing, brushing, drawing and extrusion. The coated substrate is then exposed immediately to actinic irradiation or ionizing irradiation to cure the coating before any significant amount of water is released from the applied film. The cured coatings will usually have thicknesses in the range from 0.1 to 100 mils, more typically in the range from 1 to 40 mils. As noted, curing can be effected in oxygen-containing or iert atmospheres.

The following examples are provided to illustrate the invention, but are not to be construed as limiting the invention. All amounts are in parts by weight, unless otherwise specified.

EXAMPLE I

A hydroxy-functional polyester is prepared by effecting reaction in a conventional manner between 1.77 mols adipic acid, 0.88 mols isophthalic acid, 1.33 mols 4,1-cyclohexane dimethanol, 1.33 mols poly(ethylene glycol) having a molecular weight of 200, and 1.00 mols trimethylolpropane. The resulting polyhydroxy polyester is fully esterified with acrylic acid. The resulting acrylated polyester is identified as AP-A.

Water in varying amounts is added by simple mixing to acrylated polyester AP-A. Each sample is coated on vinyl asbestos floor tile and the samples are cured by exposure to ultraviolet light in air employing as a photocatalyst system a mixture comprising 1 PBW benzoin isobutyl ether and 3 PBW benzophenone and in nitrogen employing as a photocatalyst system 1 PBW benzoin isobutyl ether. After 24 hrs, 60° gloss measurements are made on the cured products with the following results:

| PBW | | 60° Gloss | |
|---|---|---|---|
| Resin AP-A | Water | N$_2$ Cure | Air - Cure |
| 100 | 0 | 89 | 91 |
| 100 | 5 | 85 | 86 |
| 100 | 10 | 74 | 70 |
| 100 | 15 | 40 | 45 |
| 100 | 25 | 12 | 12 |

Translucent coatings with reduced gloss are achieved by the incorporation of water into the organic formulations, the gloss being lower with increasing amounts of water. Of the samples containing water, the samples cured in nitrogen are more translucent than those cured in air.

EXAMPLE II

A hydroxy-functional polyester is prepared by effecting reaction in a conventional manner between 1.92 mols adipic acid, 0.96 mols isophthalic acid, 2.59 mols 1,4-cyclohexane dimethanol, 0.29 mols poly(ethylene glycol) having a molecular weight of 200, and 1.00 mols trimetheylolpropane. The resulting polyhydroxy polyester is fully esterified with acrylic acid. The resulting acrylated polyester is identified as AP-B.

The experiments of Example I are repeated with acrylated polyester AP-B. The introduction of water is somewhat more difficult but reduced gloss values are obtained, as demonstrated in the following Table:

| PBW | | 60° Gloss | |
|---|---|---|---|
| Resin AP-B | Water | N$_2$ Cure | Air - Cure |
| 100 | 0 | 94 | 95 |
| 100 | 5 | 93 | 92 |
| 100 | 10 | 88 | 82 |
| 100 | 15 | 81 | 72 |
| 100 | 25 | 34 | 39 |

All of the coatings which contained water are opaque rather than translucent.

EXAMPLE III

A hydroxy-functional polyester is prepared by effecting reaction in a conventional manner between 1.94 mols adipic acid, 0.21 mols isophthalic acid, 2.81 mols poly(ethylene glycol) having a molecular weight of 200, and 0.35 mols glycerine.

One molar equivalent of the thus-prepared polyhydroxy polyester is reacted with 2.0 molar equivalents each of 4,4'-methylene-bis(cyclohexyl isocyanate) and 2-hydroxyethyl acrylate to form an acrylated urethane substantially free of reactive isocyanate groups. The resin is identified as acrylated polyurethane APU-C.

To the acrylated polyurethane APU-C are added various combinations of water, 2-ethylhexyl acrylate and benzoin isobutyl ether photocatalyst. The resulting formulations are coated onto vinyl asbestos floor tile and cured by exposure to ultraviolet light in nitrogen. The following data are obtained.

| PBW | | | | Appearance | | |
|---|---|---|---|---|---|---|
| Resin APU-C | Photo-Catalyst | 2-Ethyl-Hexyl Acrylate | Water | Formulation Before Cure | Film After Cure | Surface Gloss |
| 70 | 1.0 | 0.0 | 10 | Opaque | Translucent | High Gloss |
| 85 | 1.0 | 0.0 | 15 | " | " | Satin |
| 80 | 1.0 | 0.0 | 20 | " | " | " |
| 81 | 1.0 | 9.0 | 10 | " | " | " |
| 765 | 1.0 | 8.0 | 15 | " | " | Flat |
| 72 | 1.0 | 8.0 | 20 | " | " | Satin |

EXAMPLE IV

A hydroxy-functional polyester is prepared by effecting reaction in a conventional manner between 1.01 mols adipic acid, 0.11 mols isophthalic acid, 1.74 mols poly(ethylene glycol) having a molecular weight of 400, and 0.38 mols glycerine.

One molar equivalent of the thus-prepared polyhydroxy polyester is reacted with 2.0 molar equivalents each of 4,4'-methylene-bis(cyclohexyl isocyanate) and 2-hydroxyethyl acrylate to form an acrylated urethane substantially free of reactive isocyanate groups. The resin is identified as acrylated polyurethane APU-D.

To the acrylated polyurethane APU-D are added various amounts of water and benzoin isobutyl ether photocatalyst. The formulations are coated onto vinyl sheet goods and cured according to the procedure of Example III. The following data are obtained.

| PBW | | | Appearance | | |
|---|---|---|---|---|---|
| Resin APU-D | Photo-Catalyst | Water | Formulation Cure | Film After Cure | Surface Gloss |
| 90 | 1.0 | 10 | Transparent | Transparent | High Gloss |
| 85 | 1.0 | 13 | " | " | High Gloss |
| 80 | 1.0 | 20 | " | " | High Gloss |

As the data show, the failure to form a stable water-in-oil emulsion results in a cured film which is not light-scattering.

EXAMPLE V

Acrylated urethane resin APU-E is prepared from 1 mol 1,3-butylene glycol/adipic acid/glycerine polyester polyol having a hydroxyl functionality of 2.5, 3.1 mols 3.1 mols 4,4'-methylene-bis(cyclohexyl isocyanate) and 3.7 mols 2-hydroxyethyl acrylate.

To the acrylated polyurethane APU-E are added various combinations of water, 2-ethylhexyl acrylate and benzoin isobutyl ether photocatalysts. The formulations are coated onto vinyl asbestos floor tile and cured according to the procedure of Example III. The following data are obtained.

| PBW | | | | Appearance | | |
|---|---|---|---|---|---|---|
| Resin APU-E | Photo-Catalyst | 2-Ethyl-Hexyl Acrylate | Water | Formulation Before Cure | Film After Cure | Surface Gloss |
| 70 | 1.0 | 3.0 | 0 | Opaque | Opaque | 92 |
| 66.5 | 1.0 | 23.5 | 5 | " | " | 84 |
| 64.75 | 1.0 | 27.75 | 7.5 | " | " | 70–62 |
| 63 | 1.0 | 27 | 10 | " | " | 62–43 |
| 59.5 | 1.0 | 25.5 | 15 | " | " | 50–44 |

EXAMPLE VI

Acrylated polyurethane resin APU-F is prepared from 1.0 mols poly(tetramethylene oxide) diol having a molecular weight of 650, 3.0 mols 4,4'-methylene-bis(cyclohexyl isocyanate) and 4.0 mols 2-hydroxyethyl acrylate.

To acrylated polyurethane resin APU-F are added various combinations of water, 2-ethylhexyl acrylate and benzoin isobutyl ether photocatalyst. The formulations are coated onto vinyl asbestos floor tile and cured according to the procedure of Example III. The following data are obtained.

| PBW | | | | Appearance | | |
|---|---|---|---|---|---|---|
| Resin APU-F | Photo-Catalyst | 2-Ethyl-Hexyl Acrylate | Water | Formulation Before Cure | Film After Cure | Surface Gloss |
| 80 | 1.0 | 10 | 10 | Opaque | Translucent | Flat |
| 70 | 0.8 | 9 | 21 | " | Opaque | " |
| 60 | 0.6 | 8 | 32 | " | " | " |

EXAMPLE VII

To a reaction vessel equipped with stirrer, condenser, thermometer and air purge are charged 327.8 gm of polycaprolactione diol (800 MW), 1599.7 gm poly(ethylene oxide-propylene oxide) diol (1000 MW) and 863.6 gm tolylene diisocyanate. The contents are heated to 80° C. with stirring and the reaction is continued until substantially all of the free hydroxyl groups are consumed. To the resulting isocyanate-functional prepolymer are added 1500 gm tetraethylene glycol diacrylate and 713.9 gm 2-hydroxyethyl acrylate. The reaction is continued until the % NCO of the reaction mixture is less than 0.1%. The resulting acrylourethane oligomer is identified as Resin ACR-I.

Resin ACR-I is used to prepare the following coatings formulations (all amounts are in parts by weight):

| Ingredients | Formulation | | |
|---|---|---|---|
| Resin ACR-I | 170 | 170 | 170 |
| Tetraethylene Glycol Diacrylate | 144 | 144 | 144 |

-continued

| Ingredients | Formulation | | |
| --- | --- | --- | --- |
| Silica | 20 | 20 | 0 |
| Benzophenone | 7 | 7 | 7 |
| Benzoin Isobutyl Ether | 3 | 3 | 3 |
| Water | 0 | 39 | 0 |
| Appearance | Hazy | Milky | Clear |
| Gloss, Cured Film | 70 | 46 | 93 |

The formulations are prepared by blending all ingredients into Resin ACR-I. Each formulation is case on vinyl asbestos tile and cured in air at 100 feet/minute by exposure to ultraviolet radiation, using two 200 watt/inch medium pressure mercury lamps. The data demonstrate the combined effect of water and flatting agent on the gloss level of the cured films.

What is claimed is:

1. A method of producing light-scattering film comprising applying to a substrate a substantially continuous film comprising a water-in-oil emulsion consisting essentially of a continuous organic phase containing no inert organic solvent, said organic phase having homogeneously dispersed therein discrete droplets of water, said organic phase containing at least one olefinically unsaturated radiation-curable polymeric material and containing no material having ionogenic structural features, said polymeric material being substantially water-insoluble, essentially non-reactive with water and having at least one olefinically unsaturated group per molecule, the amount of water being sufficient to provide a stable water-in-oil emulsion which is visually translucent to opaque, and exposing said applied film to a source of radiation energy for a time sufficient to cure such film before water is released from said film.

2. A method according to claim 1 wherein said radiation-polymerizable polymeric material has incorporated therein at least one actinic radiation-responsive photopolymerization catalyst and said cure is effected by exposure to a source of actinic irradiation.

3. A method according to claim 1 wherein said radiation-curable polymeric material has incorporated therein at least one opacifying pigment, said pigment being present in a weight ratio of pigment to polymer solids from 0.1:1 to 5:1.

4. A method according to claim 1 wherein said discrete droplets of water have encapsulated therein at least one opacifying pigment, said pigment being present in a weight ratio of from 0.1 to 1.5 parts of pigment per part of radiation-curable polymeric material.

5. A method according to claim 1 wherein said polymeric material having non-ionogenic structural features is derived at least in part from at least one poly(alkylene oxide) polyol having from 1 to 9 carbon atoms in the alkylene chain separating each pair of oxygen atoms.

* * * * *